United States Patent
Renon et al.

(10) Patent No.: US 8,083,177 B2
(45) Date of Patent: Dec. 27, 2011

(54) MEANS FOR PREVENTING THE ROTATION OF A PIN SUPPORTING A TURBINE ENGINE SUSPENSION MEMBER

(75) Inventors: Olivier Renon, Courpalay (FR); Paul Rodrigues, Savigny sur Orge (FR); Christian Rene Schnell, Forges (FR); Jean-Luc Soupizon, Vaux le Penil (FR)

(73) Assignee: SNECMA, Paris (FR)

( * ) Notice: Subject to any disclaimer, the term of this patent is extended or adjusted under 35 U.S.C. 154(b) by 576 days.

(21) Appl. No.: 12/265,198

(22) Filed: Nov. 5, 2008

(65) Prior Publication Data
US 2009/0134270 A1 May 28, 2009

(30) Foreign Application Priority Data
Nov. 9, 2007 (FR) ...................................... 07 07882

(51) Int. Cl.
*B64D 27/00* (2006.01)
*F16M 13/00* (2006.01)
(52) U.S. Cl. .......... 244/54; 248/554; 248/555; 411/120; 411/132; 411/135
(58) Field of Classification Search .................... 244/54; 248/554, 555; 180/291; 411/120, 132–135, 411/339
See application file for complete search history.

(56) References Cited

U.S. PATENT DOCUMENTS

| 2,328,987 | A | * | 9/1943 | Martin | 248/554 |
| 2,587,345 | A | * | 2/1952 | Lombard | 248/555 |
| 4,943,013 | A | | 7/1990 | Kapala et al. | |
| 6,330,995 | B1 | * | 12/2001 | Mangeiga et al. | 248/554 |
| 6,669,393 | B2 | * | 12/2003 | Schilling | 403/2 |

FOREIGN PATENT DOCUMENTS

| EP | 0 357 504 | 3/1990 |
| WO | WO 85/02596 | 6/1985 |

* cited by examiner

*Primary Examiner* — David H Bollinger
(74) *Attorney, Agent, or Firm* — Oblon, Spivak, McClelland, Maier & Neustadt, L.L.P.

(57) ABSTRACT

A device for mounting a suspension member on the casing of a turbine engine is disclosed. The device includes a yoke with at least one lug, secured to the casing, a pin fixed to the yoke supporting the member via a ring surrounding the pin, and a rotation-prevention device that includes a counter-rotation plate attached to the lug. The plate and the pin include an assembly consisting of a peg and of a cutout or a hole, into which the peg fits in order to prevent the pin from rotating in the yoke.

7 Claims, 2 Drawing Sheets

MEANS FOR PREVENTING THE ROTATION OF A PIN SUPPORTING A TURBINE ENGINE SUSPENSION MEMBER

BACKGROUND OF THE INVENTION

1. Field of the Invention

The present invention relates to the mounting of a suspension member for a turbine engine such as a turbojet engine. It relates in particular to the mounting of a suspension member comprising a means aimed at preventing the suspension pin from rotating so as to avoid the problems that result from pin vibration and wear.

2. Description of the Related Art

A propulsion engine, such as a turbojet engine, may be mounted at various points on the airplane by being attached to a strut belonging to the structure of this airplane. It may be suspended under the wings, fixed to the fuselage or mounted in the empennage using attachment means. The purpose of these attachment means is to transmit mechanical load between the engine and the structure of the turbojet engine. The loads that have to be taken into consideration are directed in the three main directions. These are, in particular, the weight of the engine, its thrust, and lateral aerodynamic loadings. The loads that need to be transmitted also include reacting the torque about the axis of the engine. These means have also to absorb the deformations experienced by the engine during the various phases of flight on account in particular of dimensional variations due to thermal expansion or contraction.

One method of suspension, for example in the case of a turbofan engine, is to attach the engine to a strut belonging to the structure of the wing of the airplane using a forward suspension or hard point and a rear suspension or hard point. The forward suspension is fixed in particular to the intermediate casing downstream of the fan casing and the rear suspension is fixed to the jet pipe.

In a known configuration, the forward suspension is designed to transmit vertical and tangential mechanical load between the engine and the airplane. The rear suspension is designed to transmit mechanical load in these same directions and to react engine torque about the axis of the turbojet engine and to react thrust. The latter is transmitted via two thrust reaction rods attached, at the front, to the base of the intermediate casing on each side of the longitudinal axis and, at the rear, to the engine rear suspension means.

In general, a suspension means comprises a beam, possibly a double beam, fixed to the strut by bolts and connected to the engine casing by link rods. The link rods swivel at their ends in yokes or brackets, depending on how they are mounted, secured respectively to the casing and to the beam. In order for the load transmitted through the link rods to be purely axial, a ball swivel is provided on the through-pins, at each end thereof. This method of mounting in particular makes it possible to absorb the radial and axial expansions of the engine.

As depicted in FIG. 1, a link rod 30 is fixed to the lugs 20 and 21 of a casing yoke via a stepped pin 22, fixed by two bushings 40 and 50 to the two lugs, passing through the top end of the link rod. The link rod 30 has a bore into which there is set a cage 35 with a spherical interior surface. The latter acts as a guide for a ring 70 with a spherical exterior surface, fixed to the pin, thus forming a ball joint. There is clearance between the bushings and the ball 70. The ball can move axially along the pin. Said pin is held in place by a nut and a washer with clearance between the washer and the lug of the yoke.

Thanks to this ball-joint setup, the top of the link rod can pivot not only about the pin but also about any axis perpendicular thereto within the limits of the end stops defined by the surroundings. The movement is limited particularly according to the space, left on each side, between the top of the link rod and the lugs of the yoke. One exemplary embodiment of a link rod suspension device is given in patent application FR 0 357 504.

Over the course of the life of the engine, the connecting pin is made to undergo microscopic movements due to vibrational loadings, and in particular to influences directed parallel to the pin, particularly on account of the fact that the link rods are slightly inclined with respect to the casing. Over time, repeated influences of this type cause frictional wear on the pin and on the bushings. In addition, the change in diameter of the casing, as a result of expansion, associated with a distributed load over the link rods may cause the pin to rotate about its mount.

The applicant company has set itself the objective of mounting a suspension member on turbine engine casing yokes that is able to avoid the wear problems due to friction at the lugs, at the bushings and at the suspension pins by preventing said suspension pin from rotating.

BRIEF SUMMARY OF THE INVENTION

According to the invention, the device for mounting a suspension member on the casing of a turbine engine comprising a yoke with at least one lug, secured to the casing, a pin fixed to said yoke supporting said member via a ring surrounding the pin, said device comprising a rotation-prevention means comprising a counter-rotation plate attached to the lug, is one wherein said plate and the pin comprise an assembly consisting of a peg and of a cutout or a hole, into which said peg fits in order to prevent the pin from rotating in the yoke.

One advantage of the invention is that it becomes possible, with a simple means, to prevent the problems due to the change in diameter of the casing through expansion, which is associated with a distributed load on the link rods. This setup also has the advantage of limiting vibration.

According to another feature, the plate is prevented from rotating relative to the yoke by a bolted connection, consisting of a screw passing through the plate and the lug and held in place by a nut.

The present invention relates to a turbine engine casing comprising at least one yoke with at least one lug comprising at least one device for mounting a suspension member as outlined hereinabove.

The present invention also relates to a turbine engine comprising at least one device for mounting a suspension member as outlined hereinabove.

BRIEF DESCRIPTION OF THE SEVERAL VIEWS OF THE DRAWINGS

The objects, aspects and advantages of the present invention will be better understood following the description given hereinafter of the various embodiments, which are provided by way of nonlimiting example, with reference to the attached drawings in which.

DETAILED DESCRIPTION OF THE INVENTION

Figure 1:
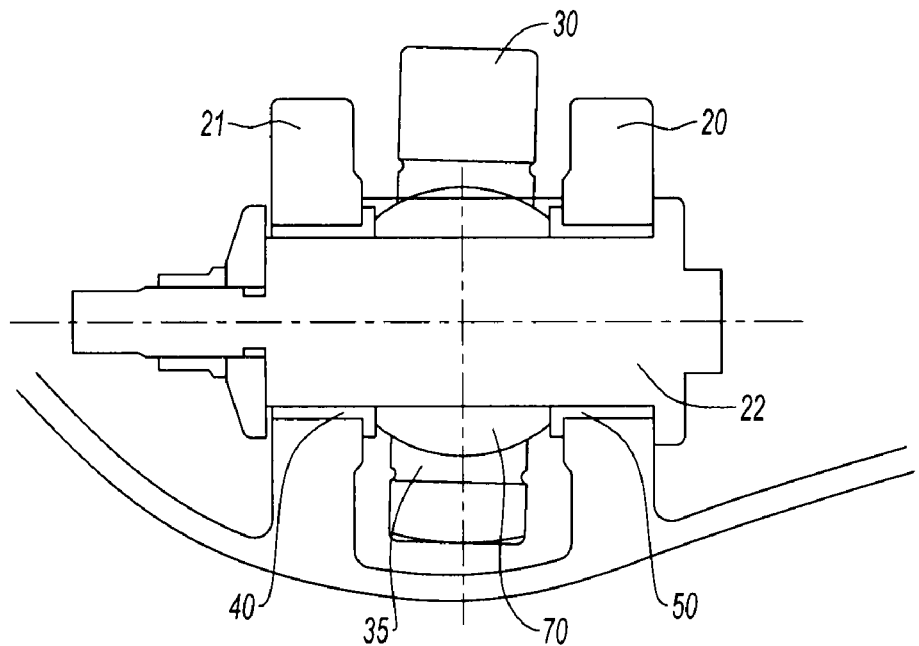
FIG. 1 depicts the mounting of a suspension member on a yoke according to the prior art.
Figure 2:
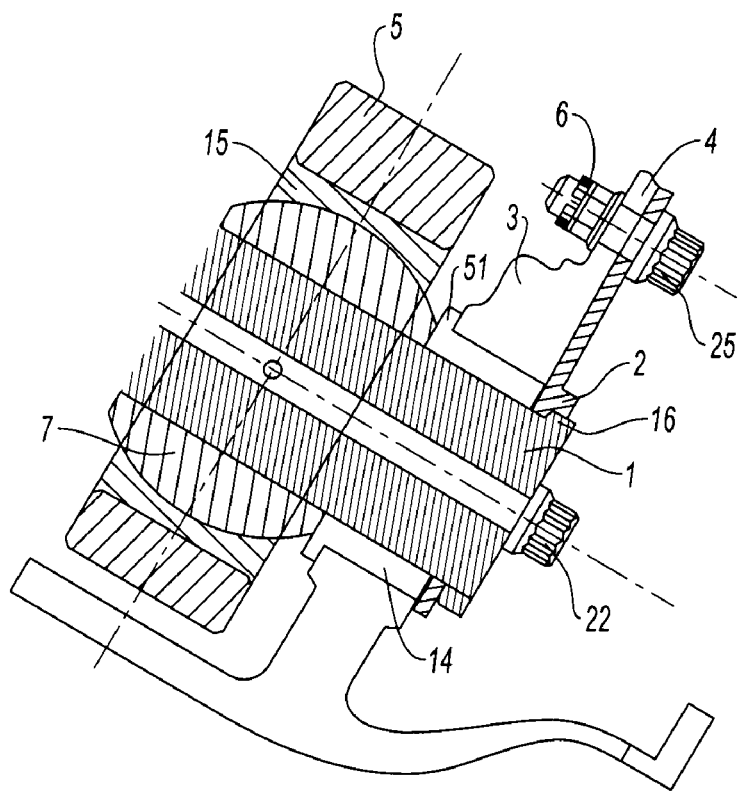
FIG. 2 depicts one embodiment of the device for mounting a suspension member according to the invention.
Figure 3:
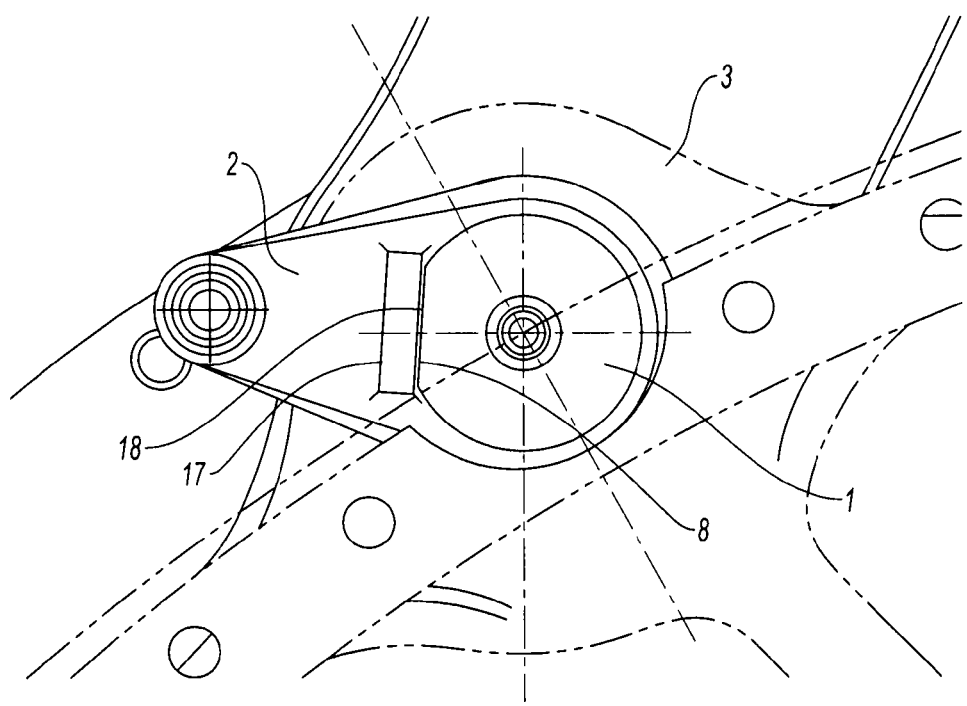
FIG. 3 depicts the device of FIG. 2 in a side view.

The device is described in greater detail with reference to FIGS. 2 and 3 which show a yoke 3 secured to the casing and comprising two lugs. Only one lug 4 is visible; this is pierced with a bore through which there passes a pin 1 supporting a link rod 5 via a ball joint. The pin 1 passes through the link rod 5 and through the lug 4 of the yoke.

The link rod 5 itself has a bore within which there is set a cage 15 with a spherical interior surface. The internal surface of the cage 15 acts as a guide for a ring 7 with a spherical exterior surface, which is fixed to the pin 1, at its middle, forming a ball joint. The ring 7 surrounds the pin 1, and the ball joint allows the link rod 5 to pivot not only about the pin 1 but also about any axis perpendicular thereto and passing through the center of the ball.

The pin 1 is mounted in the bore of the lug 4 of the yoke 3 via a bushing 14. The bushing 14 is of cylindrical shape with a step 51 at its end thus keeping it in abutment against the lug 4. In this embodiment, the pin 1 is pressed hard up against the yoke so as to limit as far as possible any wear due to friction of the pin against the yoke 3.

A screw 22 (FIG. 2), which is held in place by a nut that has not been depicted in the figures, passes longitudinally through the pin 1 at its middle. The pin 1, of cylindrical shape, comprises at its end a step 16 on which a flat surface is formed thus creating a flat 8 (depicted in FIG. 3). Said step 16 presses against a plate 2, itself pressing against the lug 4 of the yoke 3.

The plate 2 (FIGS. 2 and 3) comprises a counter-rotation tab 17 (FIG. 3) of rectangular shape, thus forming a surface 18 against which the flat 8 of the pin 1 butts. Thus, the plate 2, via the tab 17, prevents the pin 1 from rotating.

A screw 25 passes through the tab 2 and the lug 4 of the yoke 3. It is held in place by a nut 6, thus forming a bolted connection between said plate and the lug 4. Thus, by means of said bolted connection, the plate 2 is prevented from rotating relative to the yoke 3.

The solution allows the pin 1 to be held stationary relative to the yoke in spite of the vibration to which it is subjected during the engine operation.

These embodiments are nonlimiting and so, in other embodiments of the invention which have not been depicted in the figures, the bolted connection made by the screw 25 and the nut 6 (FIG. 2), preventing the plate 2 from rotating relative to the yoke 3, could be replaced by a peg secured either to the yoke 3 or to the plate 2.

In another embodiment, the counter-rotation tab 17 could be replaced by a peg secured to the plate 2. In that case, a hole or a cutout, in the region of the step 16 of the pin 1, would serve to attach said peg. In that system, the peg of the plate 2 would enter the hole in the pin 1 thus preventing it from rotating. In that embodiment, the pin 1 would not be pressed tightly against the yoke 3 in the axial direction.

The invention claimed is:

1. A device for mounting a suspension member on the casing of a turbine engine comprising:
    a yoke with at least one lug, secured to the casing;
    a pin fixed to said yoke supporting said member via a bushing surrounding the pin, an end of the pin includes a step on which a flat surface is formed and a first side of the bushing including a step which abuts a first side of the yoke in an axial direction; and
    a counter-rotation plate attached to the lug, a first side of the plate abuts a second side of the yoke and a second side of the bushing in the axial direction,
    wherein a second side of the plate includes a counter-rotation tab with a surface against which the flat surface of the step of the end of the pin abuts.

2. A device for mounting a suspension member on the casing of a turbine engine comprising:
    a yoke with at least one lug, secured to the casing;
    a pin fixed to said yoke supporting said member via a ring surrounding the pin; and
    a rotation-prevention means comprising a counter-rotation plate attached to the lug,
    wherein said plate and the pin comprise an assembly consisting of a peg and of a cutout or a hole, into which said peg fits in order to prevent the pin from rotating in the yoke, and
    wherein the plate is prevented from rotating relative to the yoke by a bolted connection.

3. The device as claimed in claim 2, wherein the bolted connection consists of a screw passing through the plate and the lug and held in place by a nut.

4. A turbine engine casing comprising at least one yoke with at least one lug comprising at least one device for mounting a suspension member as claimed in one of claims 1 to 3.

5. A turbine engine comprising at least one device for mounting a suspension member as claimed in one of claims 1 to 3.

6. The device as claimed in claim 1, wherein the counter-rotation tab is of rectangular shape.

7. The device as claimed in claim 1, further comprising a screw which passes longitudinally through the pin.

* * * * *